(12) United States Patent
Dillon et al.

(10) Patent No.: US 6,739,600 B1
(45) Date of Patent: May 25, 2004

(54) EXPANDING SLEEVE FIXTURE

(75) Inventors: Roderick Brent Dillon, Fort Wayne, IN (US); Scott Allen Stucker, Fort Wayne, IN (US); Trevor O'Bryan McKinney, Fort Wayne, IN (US)

(73) Assignee: Spicer Technology, Inc., Ft. Wayne, IN (US)

( * ) Notice: Subject to any disclaimer, the term of this patent is extended or adjusted under 35 U.S.C. 154(b) by 412 days.

(21) Appl. No.: 09/638,033

(22) Filed: Aug. 15, 2000

(51) Int. Cl.$^7$ ................................................. B23B 31/40
(52) U.S. Cl. .......................... 279/2.02; 72/125; 82/169; 269/48.1
(58) Field of Search ............................. 279/2.02–2.04, 279/2.12, 2.17, 136; 269/48.1; 82/169, 150; 409/62; 72/125

(56) References Cited

U.S. PATENT DOCUMENTS

| | | | |
|---|---|---|---|
| 2,675,725 A | * 4/1954 | Keebler | 82/150 |
| 3,025,735 A | * 3/1962 | MacArthur | 82/150 |
| 3,111,326 A | 11/1963 | Sattler | |
| 3,212,374 A | * 10/1965 | Anthony | 82/169 |
| 3,263,536 A | * 8/1966 | Anthony | 82/169 |
| 3,420,537 A | 1/1969 | Walters | |
| 3,456,955 A | 7/1969 | Bruinsma | |
| 3,492,914 A | * 2/1970 | Anthony | 82/169 |
| 3,517,939 A | 6/1970 | Jaehn | |
| 3,761,008 A | 9/1973 | Goulder | |
| 4,201,394 A | 5/1980 | Morawski | |
| 4,373,411 A | 2/1983 | Kanakaris | |
| 4,467,631 A | 8/1984 | Killop | |
| 4,720,114 A | 1/1988 | Braitmaier et al. | |
| 5,868,400 A | 2/1999 | Davis | |

FOREIGN PATENT DOCUMENTS

JP    406079569 A  * 3/1994  ................. 269/48.1

* cited by examiner

*Primary Examiner*—Steven C. Bishop

(57) ABSTRACT

A push-type expandable fixture provided to secure a work-piece to a rotatable machine. An expandable sleeve is inserted within a bore of a hollow work-piece. The work-piece together with the expandable sleeve is disposed about a pair of wedge members which are in turn secured to a first rotatable portion of the machine. The wedge members engage a corresponding tapered internal surface of the expandable sleeve. The second wedge member is longitudinally displaceable relative to the first wedge member and together extends through the work-piece to engage a second rotatable portion of the machine. As the first and second rotatable portions of the machine are brought toward one another, the wedge members act on the tapered surfaces of the sleeve forcing the sleeve to radially expand and firmly grip the work-piece. The arrangement provides the ability to firmly secure a work-piece to a rotatable machine tool by a simple push-type action without the need to induce compression forces on the work-piece. The arrangement is especially suited for securing a differential side gear to a rotatable machine tool to allow roll forming of the side gear's bevel gear teeth.

2 Claims, 3 Drawing Sheets

Fig. 5
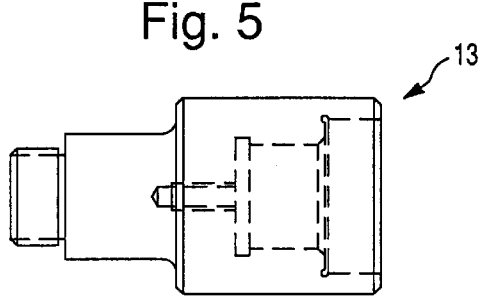
Fig. 6
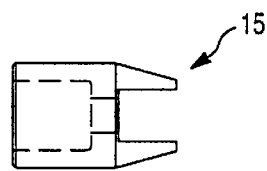
Fig. 7a
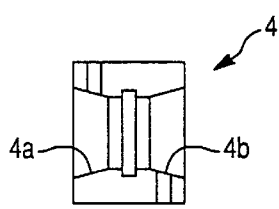
Fig. 7b
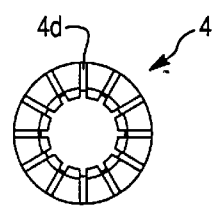
Fig. 7c
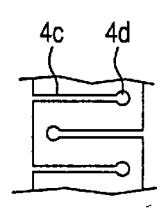
Fig. 8a
Fig. 8b
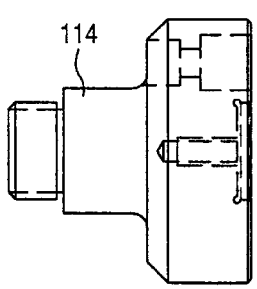
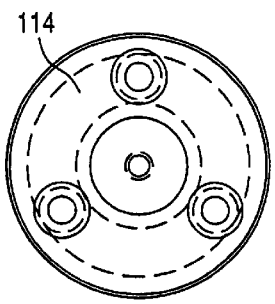
Fig. 9a
Fig. 9b
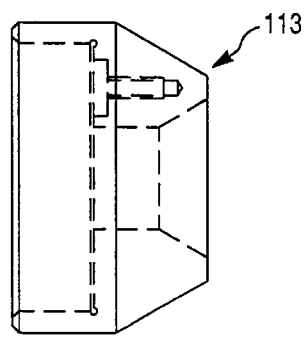
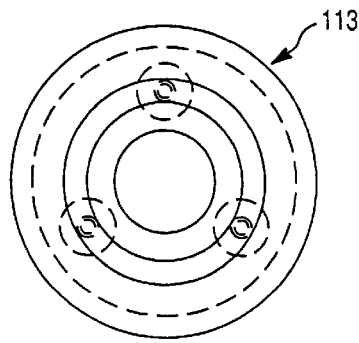

EXPANDING SLEEVE FIXTURE

BACKGROUND OF THE INVENTION a) Filed of the Invention

The present invention relates to an expanding sleeve fixture and more particularly to a push-type expanding fixture to secure a work-piece to a rotatable machine without inducing compression forces.

b) Background of the Related Art

Numerous devices have been developed to hold and center work-pieces. These devices include collapsible-type mechanisms wherein a collet or chuck tightens onto a portion of a work-piece, and expansible-type mechanisms wherein an expandable collet or chuck member is inserted into an internal bore or opening of a work-piece and expanded therein to grip or hold the work-piece on the expandable member. However, previously known devices for holding and centering work-pieces have proven deficient in various respects. Particularly, the procedures for attaching and detaching the work-piece from the devices are relatively time consuming and complex, and can require the tightening and loosening of multiple parts with special chuck tools in order to attach and detach the work-pieces, which adds to the time and cost ultimately required for preparation of machined parts. Another problem is that many devices are complex in design and include numerous movable parts which are subject to wear and failure. A further drawback is that prior art devices induce a compression force on the work-piece when attempting to expand an internal mandrel. The drawbacks of the prior art hinder the effective use of currently available holding devices with the advanced machine tools used in modern manufacturing operations. Moreover, the prior art devices do not facilitate the holding of a side gear to facilitate a roll forming process.

Accordingly, there is a need for a push-type expanding mandrel apparatus which quickly and releasably holds a work-piece, which does not induce a compression force on the work-piece, and is suitable for use with high precision machine tools. The present invention overcomes the drawbacks of the prior art and other related art.

SUMMARY OF THE INVENTION

The present invention alleviates the drawbacks of the related art. A push-type expandable fixture is provided to secure a work-piece to a rotatable machine. Two rotatable portions of the machine are capable of longitudinally moving in toward each other. An expandable sleeve is inserted within a bore of a hollow work-piece. The work-piece together with the expandable sleeve is disposed on a pair of wedge members which are in turn secured to a first rotatable portion of the machine. The second wedge member is longitudinally displaceable relative to the second wedge member. The pair of wedge members together extend through the work-piece to engage the second rotatable portion of the machine. The expandable sleeve has tapered surfaces extending radially inward and converging toward a radial inward most portion intermediate the sleeve. As the first and second rotatable portions of the machine are brought toward one another, the sleeve is forced to radially expand and thus firmly grip the work piece. The arrangement provides the ability to firmly secure a work-piece to a rotatable machine tool by a simply push-type action without the need to induce compression forces on the work-piece. The arrangement is especially suited for securing a differential side gear to a rotatable machine tool to allow roll forming of the side gear's bevel gear teeth.

Other objects and advantages of the invention will become apparent from a study of the following specification when viewed in light of the accompanying drawings.

BRIEF DESCRIPTION OF THE DRAWINGS

FIG. 5 is a side view of the second collar of FIG. 1.

FIG. 6 is a side view of the centering member of FIG. 1.

FIGS. 7A, 7B & 7C are a side sectional, front and top view, respectively, of the expanding sleeve of FIGS. 1–2.

FIGS. 8A & 8B are a front and side view of the chuck of FIG. 2 according to the alternate embodiment of the present invention.

FIGS. 9A & 9B are a front and side view of the second collar according the alternate embodiment of FIG. 2.

DETAILED DESCRIPTION OF THE PREFERRED EMBODIMENT

Figure 1:
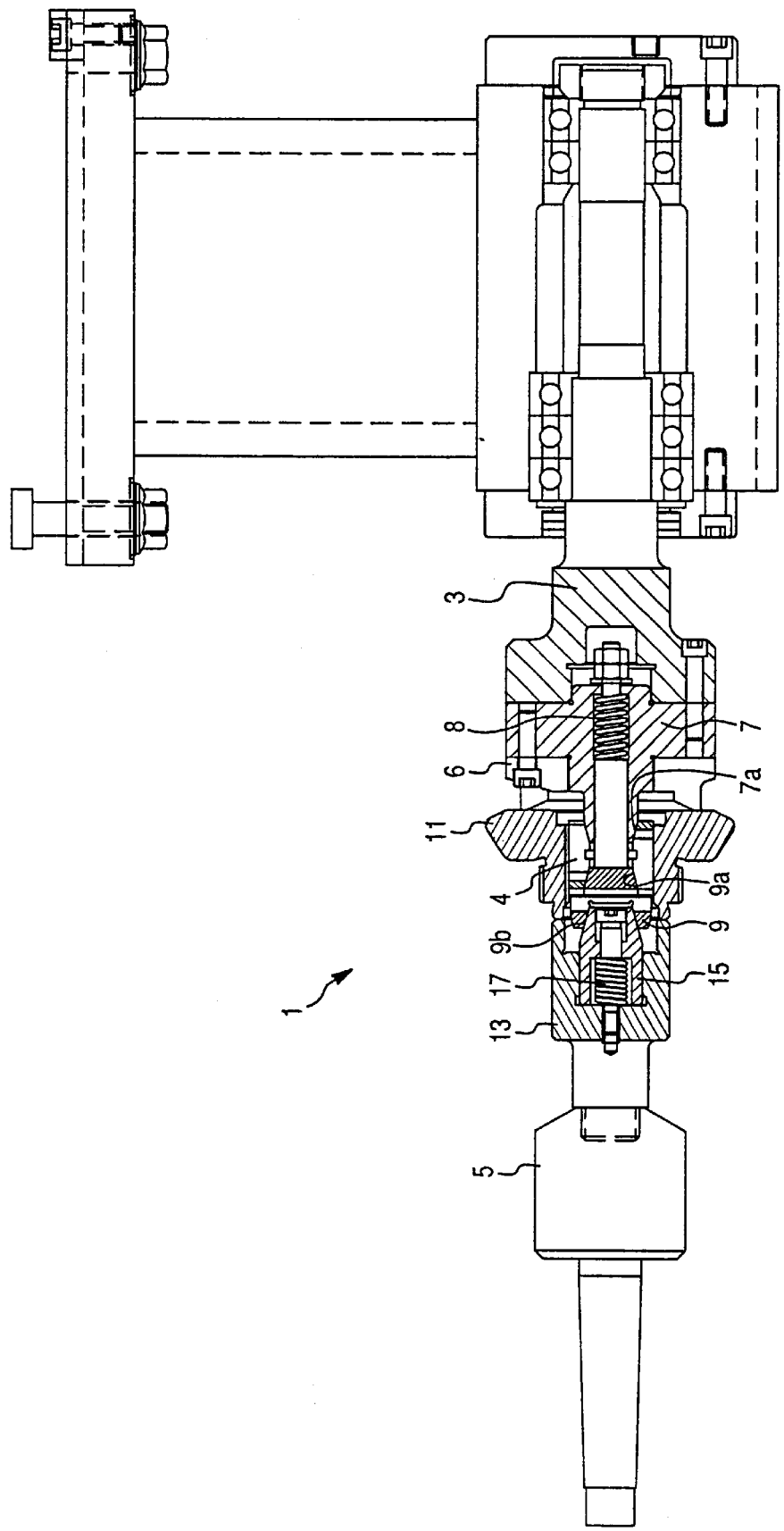
FIG. 1 is sectional view of the expanding sleeve fixture connecting a side gear to a rotatable machine according to the present invention.

FIG. 1 depicts a partial sectional view of the present invention. A rotatable machine tool 1 has a first 3 and second 3 opposite rotatable portions adjacent associated first and second ends of the rotatable machine tool 1. The first 3 and second 5 rotatable portions are longitudinally displaceable relative to each other. A first wedge member 7 is bolted to the first rotatable portion 3 for rotation therewith. The first wedge member longitudinally extends to a wedge surface 7a. A second wedge member 9 is longitudinally moveable relative to the first wedge member 7 and has a spring 8 disposed therebetween to bias the first 7 and second 9 wedge members apart. An expandable sleeve 4 is disposed about the wedge members 7,9 to engage the first 7a and second 9a wedge surfaces. A hollow work-piece 11 is disposed about the expandable sleeve 4. Preferably a first collar 6 is longitudinally disposed between the first wedge member 7 and the work-piece 11 to longitudinally position the work-piece relative to the machine tool 1.

The second wedge member 9 is adapted to engage the second rotatable portion 5 of the machine tool 1. As the first 3 and second 5 rotatable portions are pushed toward each other, the first 7 and second 9 wedge members engage the expandable sleeve 4 causing it to radially expand and firmly grip the work-piece 11. Preferably the second rotatable portion 5 has a second collar 13 and a centering member 15 to facilitate engagement with the second wedge member 9. The specific of the details expandable sleeve 4 and the engagement of the second wedge member 9 with the second rotatable portion 5 will be explained below.

Referring to FIGS. 7&-B the radially expandable sleeve 4 is a tubular body having longitudinal slots 4c extending from opposite ends of the sleeve in an alternating fashion. The slots extend only partially along the length of the sleeve and terminate in a stress-relieving hole 4d. The inner surface of the sleeve 4 is formed with opposite tapered surfaces 4a, 4b converging toward a radially inner most portion located substantially intermediate a length of the sleeve 4 to respectively engage the wedge surfaces 7a, 9a of the first 7 and second 9 wedge members. As the first 7 and second 9 wedge members are forced toward one another, the wedging action between the wedge members 7, 9 and the tapered surfaces 4a, 4b of the sleeve 4 causes the sleeve 4 to radially expand. Such expansion facilitates a firm grip of the work-piece 11.

Figure 3A:
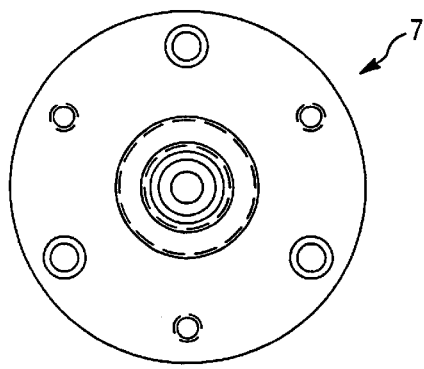
FIGS. 3A & 3B are a front and side sectional view, respectively, of the first wedge member of FIG. 1.
Figure 3B:
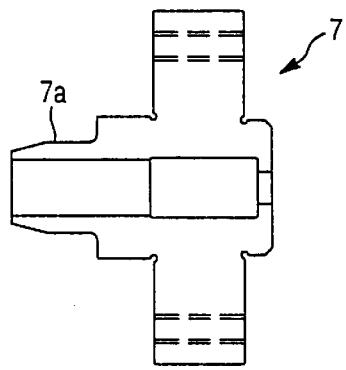
Figure 4A:
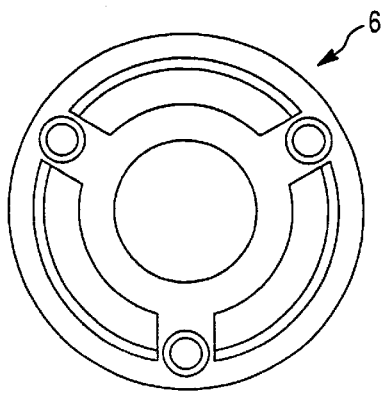
FIGS. 4A & 4B are a front and side sectional view, respectively, of the first collar of FIG. 1.
Figure 4B:
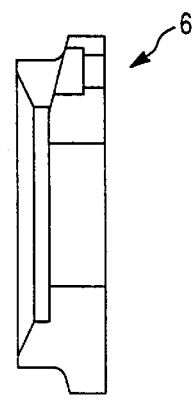

FIGS. 3A–B are front and side views of the first wedge member 7 which is bolted to the first rotatable portion 3 of the machine tool 1. FIGS. 4A–B are front and side views of the first collar 6 which is in turn bolted to the first wedge member 7. As can be seen from FIG. 3A the first wedge member 7 has six bores extending therethrough, three each to facilitate attachment to the rotatable portion 3 and first collar 6. The first collar 6 is cooperatively sized and dimensioned with the first wedge member 7 to properly align the work-piece 11 relative to the machine tool.

A second collar 13 is secured to the second rotatable portion 5 of the machine tool. The second collar 13 has a centering member 15 disposed within a recess formed therein for properly aligning the second rotatable portion 5 into engagement with the second wedge member 9. The centering member 15 has a frustroconical front end to engage a recess formed in the second wedge member 9. A second spring 17 is preferably disposed between the centering member 15 and the second collar 13 to bias the centering member 15 into engagement with the second wedge member 9. A bolt may also be disposed through the centering member 15 and second collar 13 as shown in FIG. 1 to maintain a connection therebetween. FIGS. 5–6 depict an isolated side view of the second collar 13 and centering member 15 respectively.

To utilize the expandable fixture of the present invention, the first wedge member 7, first collar 6, second wedge member 9 and expandable sleeve 4 are loosely assembled and in connection with the first rotatable portion 3. The work-piece 11 is then slid onto the expandable sleeve 4 until it abuts against the first collar 6. Preferably, the arrangement of the fixture device provides for a slight friction fit of the work-piece 11 onto the expandable sleeve 4 to retain the position of the work-piece 11 in place. However, the work-piece 11 may easily be manipulated by an installer to obtain proper position or be removed from the fixture. Once the work-piece 11 is in place, the first 3 and second 5 rotatable portions of the machine tool are simply brought together. As the first and second rotatable portions are brought together, the centering member 15 engages and aligns within a recess 9b in the second wedge member 9. As the rotatable portions 3,5 are further brought together, the first 7a and second 9a wedge surfaces engage the tapered surfaces 4a, 4b of the expandable sleeve 4 causing the expandable sleeve 4 to radially expand and firmly grip the work-piece 11. The work-piece 11 is then properly retained for machining, cutting or other operations.

Figure 2:
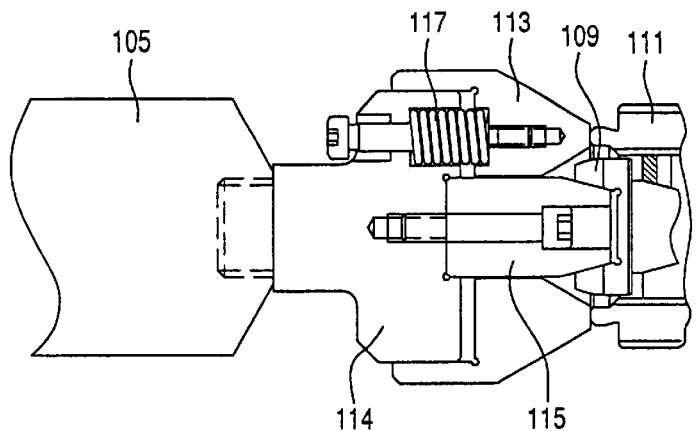
FIG. 2 is an isolated partial sectional view of the fixture adjacent the second portion of the rotatable machine according to an alternate embodiment of the present invention.

FIG. 2 depicts an alternate embodiment of the present invention. In this embodiment the connection between the second rotatable portion 105 and the second wedge member is slightly different. A chuck 114 is disposed between the second rotatable portion 105 and a centering member 115. Unlike the first embodiment the centering collar 115 is simply bolted to the chuck 114. A second collar 113 is longitudinally slidably connected to the chuck 114 and disposed between the chuck 114 and the work-piece 111. A spring 117, (or a plurality of springs) is disposed between the second collar 113 and the chuck 114 to bias the second collar 113 to engage the work-piece 111 to maintain a longitudinal position of the work-piece 111 relative to the rotatable machine 1. As can be seen in FIG. 2, the chuck 114 is partially disposed within a recess formed in the second collar 113. An alignment pin extends through the chuck 114 and the second collar 113 to maintain a connection therebetween.

FIGS. 8A, 8B are side and front views of the chuck 114. As can be seen, the chuck 114 has three recesses to accommodate an alignment pin and spring 117 to establish the longitudinally displaceable connection with the second collar 113. FIGS. 9A, & 9B depict a side and front view of the side collar 113.

The present invention is particularly adapted to retain a side gear 11 to facilitate roll forming of the gear teeth. Heretofore, the prior art failed to provide a simple push-type expanding fixture to retain a hollow work-piece onto a rotatable tool for performing a roll forming process. One the side gear is retained onto the rotatable machine as previously described, the side gear teeth are formed by a roll forming process.

While the foregoing invention has been shown and described with reference to a preferred embodiment, it will be understood by those possessing skill in the art that various changes and modifications may be made without departing from the spirit and scope of the invention. For example, while the expandable fixture of the present invention has been shown and describe for use in roll forming side gears, the present invention may be employed to secure other types of work-pieces to a rotatable machine and are thus contemplated by the present invention.

What is claimed is:

1. A combination machine tool and an expandable fixture to secure a work-piece thereto, said machine tool comprising:

first and second rotatable portions longitudinally moveable relative to each other, said first and second rotatable portions being adjacent corresponding first and second ends of said machine tool;

said expandable fixture including;

an expandable sleeve having a first and second tapered inner surface, said first and second tapered surfaces converging toward a radially inner most portion located substantially intermediate a length of said sleeve, said expandable sleeve has a plurality of alternately arranged longitudinal slots extending from either ends thereof and terminating at a stress relieving hole;

a first wedge member disposed at least partially within said expandable sleeve and connected to said first rotatable portion of said machine tool, said first wedge member has a longitudinally extending bore and is bolted to said first rotatable portion of said machine tool;

a second wedge member longitudinally movable relative to said first wedge member and engaging said second rotatable portion of said machine tool, said second wedge member has a longitudinally extending portion at least partially disposed and slidable within said bore of said first wedge member;

a spring disposed within said bore and between said first and second wedge members to bias said first and second wedged members apart, wherein said first and second wedge members together extending through said work-piece;

a first collar secured to said first wedge member and longitudinally disposed between said first rotatable portion of said machine tool and said work-piece, said first collar engaging said work-piece to longitudinally position said work-piece relative to said first rotatable portion of said machine tool;

a centering member having a frustroconical leading end engaging a recess formed in said second wedge member to align said second rotatable portion of said machine tool with said second wedge member;

a second collar disposed between said second end of said machine tool and said centering member, said centering member being disposed and longitudinally displaceable within a recess of said second collar; and a second spring disposed between said second collar and said centering member to bias said centering member into engagement with said second wedge member;

whereby when said first and second rotatable portions of said machine tool are moved toward each other, said first and second wedge members compress and cooperatively and correspondingly engage said first and second tapered surfaces causing said sleeve to radially expand and firmly grip said work-piece without a necessity to induce compression forces to said work-piece.

2. A combination machine tool and an expandable fixture to secure a work-piece thereto, said machine tool comprising:

first and second rotatable portions longitudinally moveable relative to each other, said first and second rotatable portions being adjacent corresponding first and second ends of said machine tool;

said expandable fixture including;

an expandable sleeve having a first and second tapered inner surface, said first and second tapered surfaces converging toward a radially inner most portion located substantially intermediate a length of said sleeve, said expandable sleeve has a plurality of alternately arranged longitudinal slots extending from either ends thereof and terminating at a stress relieving hole;

a first wedge member disposed at least partially within said expandable sleeve and connected to said first rotatable portion of said machine tool, said first wedge member has a longitudinally extending bore and is bolted to said first rotatable portion of said machine tool;

a second wedge member longitudinally movable relative to said first wedge member and engaging said second rotatable portion of said machine tool, said second wedge member has a longitudinally extending portion at least partially disposed and slidable within said bore of said first wedge member;

a spring disposed within said bore and between said first and second wedge members to bias said first and second wedged members apart, wherein said first and second wedge members together extending through said work-piece;

a first collar secured to said first wedge member and longitudinally disposed between said first rotatable portion of said machine tool and said work-piece, said first collar engaging said work-piece to longitudinally position said work-piece relative to said first rotatable portion of said machine tool; and a centering member having a frustroconical leading end engaging a recess formed in said second wedge member to align said second rotatable portion of said machine tool with said second wedge member;

a chuck partially disposed within a recess formed in said second collar and disposed between said second end of said machine tool and said centering member;

a second collar longitudinally slidably connected to said chuck and disposed between said chuck and said work-piece; and a second spring disposed between said second collar and said work-piece to bias said second collar to engage said work-piece to maintain a longitudinal position of said work-piece relative to said machine tool;

whereby when said first and second rotatable portions of said machine tool are moved toward each other, said first and second wedge members compress and cooperatively and correspondingly engage said first and second tapered surfaces causing said sleeve to radially expand and firmly grip said work-piece without a necessity to induce compression forces to said work-piece.

* * * * *

UNITED STATES PATENT AND TRADEMARK OFFICE
CERTIFICATE OF CORRECTION

PATENT NO. : 6,739,600 B1
DATED : May 25, 2004
INVENTOR(S) : Dillon et al.

It is certified that error appears in the above-identified patent and that said Letters Patent is hereby corrected as shown below:

Title page,
Item [73], Assignee, should read -- Torque-Traction Technologies, Inc., Holland OH --

Signed and Sealed this

Seventh Day of September, 2004

JON W. DUDAS
*Director of the United States Patent and Trademark Office*